United States Patent
Li et al.

(10) Patent No.: US 8,599,736 B2
(45) Date of Patent: Dec. 3, 2013

(54) METHOD AND APPARATUS FOR TRANSMISSION MODE SELECTION IN COOPERATIVE RELAY

(75) Inventors: Zhenhong Li, Shanghai (CN); Gang Wu, Shanghai (CN); Haifeng Wang, Shanghai (CN); Wei Zou, Shanghai (CN)

(73) Assignee: Nokia Corporation, Espoo (FI)

( * ) Notice: Subject to any disclaimer, the term of this patent is extended or adjusted under 35 U.S.C. 154(b) by 330 days.

(21) Appl. No.: 12/544,095

(22) Filed: Aug. 19, 2009

(65) Prior Publication Data

US 2011/0044295 A1 Feb. 24, 2011

(51) Int. Cl.
H04B 7/14 (2006.01)

(52) U.S. Cl.
USPC .......................... 370/315; 370/336

(58) Field of Classification Search
None
See application file for complete search history.

(56) References Cited

U.S. PATENT DOCUMENTS

| | | | | |
|---|---|---|---|---|
| 2008/0069263 | A1* | 3/2008 | Murakami et al. | 375/267 |
| 2009/0017753 | A1* | 1/2009 | Kim et al. | 455/10 |
| 2009/0262678 | A1* | 10/2009 | Oyman et al. | 370/315 |
| 2011/0250897 | A1* | 10/2011 | Seo et al. | 455/445 |

OTHER PUBLICATIONS

International Search Report and Written Opinion, received in corresponding Patent Treaty Cooperation Application No. PCT/IB2010/053712, Dated Dec. 17, 2010. 16 pages.

Sangiamwong, J. "Cooperative Diversity Aware Priority-Based Resource Allocation for Relay-Enhanced Cellular Systems", Proceedings of APCC 2008, 14th Asia-Pacific Conference, Oct. 14-16, 2008. pp. 1-5, Figure 2, Section II.

Heath, Robert W. "Switching Between Diversity and Multiplexing in MIMO Systems", IEEE Transactions on Communications, vol. 53, No. 6., Jun. 2005. pp. 962-968, Figure 2, Section VII.

Shi, Yi, "Cooperative Multiplexing and Scheduling in Wireless Relay Networks", Communications, 2008. ICC 2008 proceedings. IEEE International Conference on May 19-23, 2008. pp. 3034-3038, Section III.

Zhang, Shunqing, "Design and Analysis of Multi-Relay Selection for Cooperative Spatial Multiplexing", Communications, 2008. ICC 2008 proceedings. IEEE International Conference on May 19-23, 2008. pp. 1129-1133, whole document.

Jaafar, Wael, "Adaptive Transmission in Cooperative Wireless Communications", Wireless Days (WD), 2009 2nd IFIP on Dec. 15-17, 2009. pp. 1-5, whole document.

3GPP TR 36.814 V0.4.1(Feb. 2009); 3rd Generation Partnership Project; Technical Specification Group Radio Access Network; Further Advancements for E-UTRA Physical Layer Aspects (Release 9) (31 pages).

(Continued)

*Primary Examiner* — Andrew Lai
*Assistant Examiner* — Leon Andrews
(74) *Attorney, Agent, or Firm* — Harrington & Smith

(57) ABSTRACT

In accordance with an example embodiment of the present invention, an apparatus, comprising at least one processor; and at least one memory including computer program code, the at least one memory and the computer program code configured to, with the at least one processor, cause the apparatus to perform at least the following: select at least two relay stations from a plurality of relay stations; determine a transmission mode for cooperatively forwarding a data packet by the selected relay stations; schedule a resource allocation for the selected relay stations based at least in part on the transmission mode; and notify the selected relay stations of the resource allocation, is disclosed.

19 Claims, 4 Drawing Sheets

(56) References Cited

OTHER PUBLICATIONS

IEEE Standard P802.16j/D6, Jun. 2009, Standard for Local and metropolitan area networks, Part 16: Air Interface for Broadband Wireless Access Systems, Amendment 1: Multiple Relay Specification, IEEE Computer Society and the IEEE Microwave Theory and Techniques Society (314 pages).

IEEE 802.16j/013r3, Broadband Wireless Access Working Group, Multi-hop Relay System Evaluation Methodology (Channel Model and Performance Metric), Feb. 19, 2007 (46 pages).

IEEE C802.16m-08/1279, Broadband Wireless Access Working Group, "Cooperative HARQ for IEEE 802.16m: UL Mode," Oct. 31, 2008 (5 pages).

3GPP TS 36.300 V1.0.0 (Mar. 2007); 3rd Generation Partnership Project; Technical Specification Group Radio Acess Network; Evolved Universal Terrestrial Radio Access (E-UTRA) and Evolved Universal Terrestrial Radio Access Network (E-UTRAN); Overall description; Stage 2 (Release 8) (82 pages).

* cited by examiner

METHOD AND APPARATUS FOR TRANSMISSION MODE SELECTION IN COOPERATIVE RELAY

TECHNICAL FIELD

The present application relates to method and apparatus for transmission mode selection in cooperative relay.

BACKGROUND

Wireless communications networks typically include one or more communications stations, generally called base stations, each communicating with its subscribers, also called mobile stations. Communication link from the mobile station to the base station is typically called uplink (UL) and communication link from the base station to the mobile station is typically called downlink (DL).

Cellular mobile communication networks use bidirectional communication between the base station and the mobile stations. It may be difficult to provide high data rates throughout a cell, particularly at the cell edge, due to factors such as wireless link degradation. One way to address this problem is reduction of the range of the cell, but it may lead to additional costs.

Relaying is generally considered as a method to ensure capacity improvement and coverage extension in cellular networks. Relaying technique is an ongoing topic in the 3GPP (third generation partnership project) LTE (long term evolution) standardization forum and the WiMAX (worldwide interoperability for microwave access) IEEE 802.16 (IEEE Standard for Local and Metropolitan Area Networks Part 16: Air interface for fixed and mobile broadband wireless access systems) standardization forum.

Relaying is realized through relay stations, such as fixed relay stations and/or mobile relay stations, between a base station and its mobile stations. The relay stations have an advantage in that they may not need the intelligence of the base station or connections to the backbone networks, yet still can contribute to the communication. The interpretation of several relay stations as a virtual antenna array allows the utilization of multiple input multiple output (MIMO) technology without requiring physical multiple antennas at a relay station (RS).

Communication link from the mobile station to the base station through the relay station is typically called uplink relay link (UL relay link) and communication link from the base station to the mobile station through the relay station is typically called downlink relay link (DL relay link).

Spatial multiplexing (SM) is a MIMO technique in which multiple data streams are transmitted at the same frequency but over different spatial channels. Space time block coding (STBC) is another MIMO technique in which multiple copies of one data stream are transmitted over a number of antennas. In STBC, a receiver combines the copies of the received signal in an optimal way to extract as much information as possible. Generally, SM requires a higher signal to noise ratio (SNR) for a successful receiving compared with STBC.

Cooperative relay may further enhance the performance of a relay-based system by treating the antennas of different relay stations (RS(s)) as a part of an antenna array, and applying the multi-antenna techniques among several RS(s). By properly coordinating the transmitted signals from several RS(s), a multi-antenna processing gain may be achieved, which may significantly improve the link quality, data rate and coverage of a relay-based system.

A cooperative hop-by-hop hybrid automatic retransmission request (HARQ) scheme is disclosed in an IEEE technical document "IEEE C802.16m-08/1279, Co-operative HARQ for IEEE802.16m: UL mode". It proposes that the RS select a single RS to forward a data packet for the mobile station in a non-cooperative manner.

SUMMARY

Various aspects of examples of the invention are set out in the claims.

According to a first aspect of the present invention, an apparatus, comprising at least one processor; and at least one memory including computer program code, the at least one memory and the computer program code configured to, with the at least one processor, cause the apparatus to perform at least the following: select at least two relay stations from a plurality of relay stations; determine a transmission mode for cooperatively forwarding a data packet by the selected relay stations; schedule a resource allocation for the selected relay stations based at least in part on the transmission mode; and notify the selected relay stations of the resource allocation, is disclosed.

According to a second aspect of the present invention, a method, comprising selecting at least two relay stations from a plurality of relay stations; determining a transmission mode for cooperatively forwarding a data packet by the selected relay stations; scheduling a resource allocation for the selected relay stations based at least in part on the transmission mode; and notifying the selected relay stations of the resource allocation, is disclosed.

According to a third aspect of the present invention, a computer program product comprising a computer-readable medium bearing computer program code embodied therein for use with a computer, the computer program code comprising code for selecting at least two relay stations from a plurality of relay stations; code for determining a transmission mode for cooperatively forwarding a data packet by the selected relay stations; code for scheduling a resource allocation for the selected relay stations based at least in part on the transmission mode; and code for notifying the selected relay stations of the resource allocation, is disclosed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTON OF THE DRAWINGS

An example embodiment of the present invention and its potential advantages are understood by referring to FIGS. 1 through 10 of the drawings.

Figure 1:
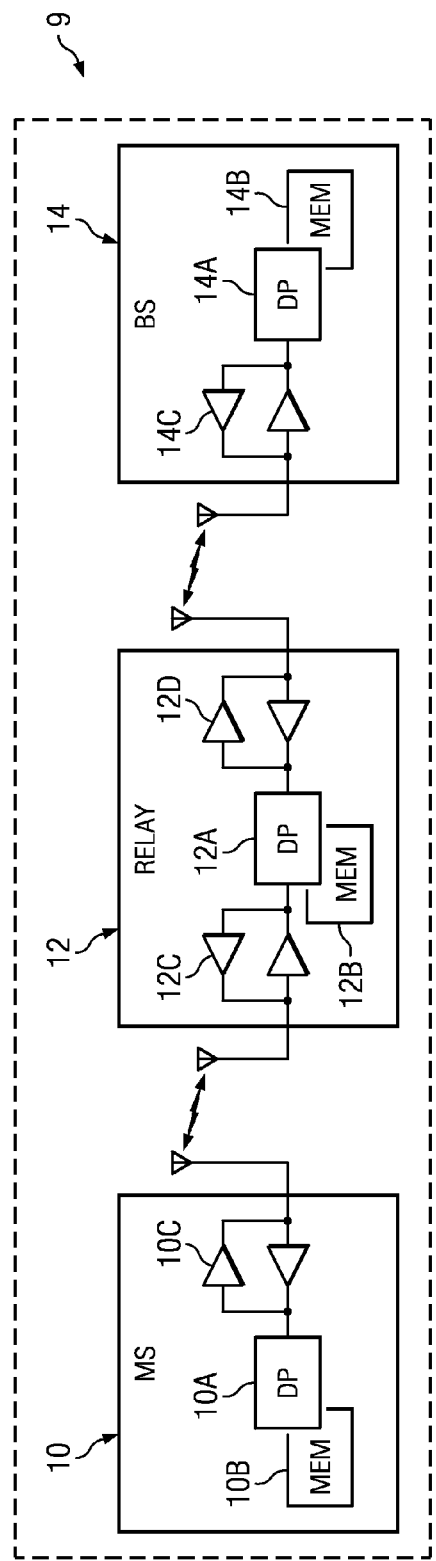
FIG. 1 shows a simplified block diagram of a system 9 that is suitable for use in practicing example embodiments of the invention.

FIG. 1 shows a simplified block diagram of a system 9 that is suitable for use in practicing example embodiments of the invention. In FIG. 1, a system 9, such as a WiMAX system or a LTE system, includes at least one base station (BS) 14, a plurality of mobile stations (MSs) 10, and one or more relay stations (RS(s)) 12. The BS 14 includes a suitable controller, such as at least one data processor (DP) 14A, operatively coupled with a memory (MEM) 14B, and at least one wireless (e.g., radio frequency RF) transceiver 14C. The MS 10 includes a suitable controller, such as at least one data processor (DP) 10A, operatively coupled with a memory (MEM) 10B, and at least one wireless (e.g., radio frequency RF) transceiver 10C. The RS 12 includes a DP 12A and associated MEM 12B. RS 12 is adapted for communication with the MS 10 and the BS 14 with at least one or two, as shown, wireless transceivers 12C, 12D. The RS 12 may be coupled directly to the MS 10, or indirectly coupled via one or more other RS(s) 12. RS 12 may be coupled directly to the BS 14, or indirectly coupled via one or more other RS(s) 12.

At least the memories 12B and 14B include program instructions (PROG), executable by the associated DPs 12A and 14A, respectively, for operation in accordance with the example embodiments of this invention, as described in further detail below. The PROGs may be embodied in software, firmware and/or hardware, as appropriate.

In general, the example embodiments of the invention may be implemented at least in part by computer software executable by the DPs 12A and 14A, or by hardware, or by a combination of software and hardware.

MS 10 may include, but are not limited to, a cellular telephone, a personal digital assistant (PDA) having wireless communication capabilities, a portable and desktop computer having wireless communication capabilities, an image capture device such as digital camera having wireless communication capabilities, a gaming device having wireless communication capabilities, a music storage and playback appliance having wireless communication capabilities, an Internet appliance permitting wireless Internet access and browsing, as well as a portable unit or terminal that incorporate combinations of such functions. Note that the MS 10 may be a mobile device, or a device intended to be used in one location for example a personal computer, as non-limiting examples.

The memories 10B, 12B and 14B may be of any type suitable to the local technical environment. The memories 10B, 12B and 14B may be implemented using any suitable data storage technology, such as semiconductor-based memory devices, flash memory, magnetic memory devices and systems, optical memory devices and systems, fixed memory and removable memory, as non-limiting examples.

The DPs 10A, 12A and 14A may be of any type suitable to the local technical environment. The DPs 10A, 12A and 14A may include one or more of general purpose computers, special purpose computers, microprocessors, digital signal processors (DSPs) and processors based on a multi-core processor architecture, as non-limiting examples.

For the purpose of explanation, uplink (UL) relay link is used as example in the following description to provide a thorough understanding of the invention. However, embodiments of the invention are not limited to these details; it may be practiced with an equivalent arrangement, for example in downlink (DL) relay link.

In a communication network, for example the system 9 having relays, a mobile station transmits data packets destined to a base station over UL relay link. One or more relay stations may decode the mobile station's transmission (UL transmission) correctly. When multiple relay stations decode the UL transmission correctly, two or more relay stations may work as a virtual antenna array to cooperatively forward the mobile station's transmission to the base station.

Figure 2:
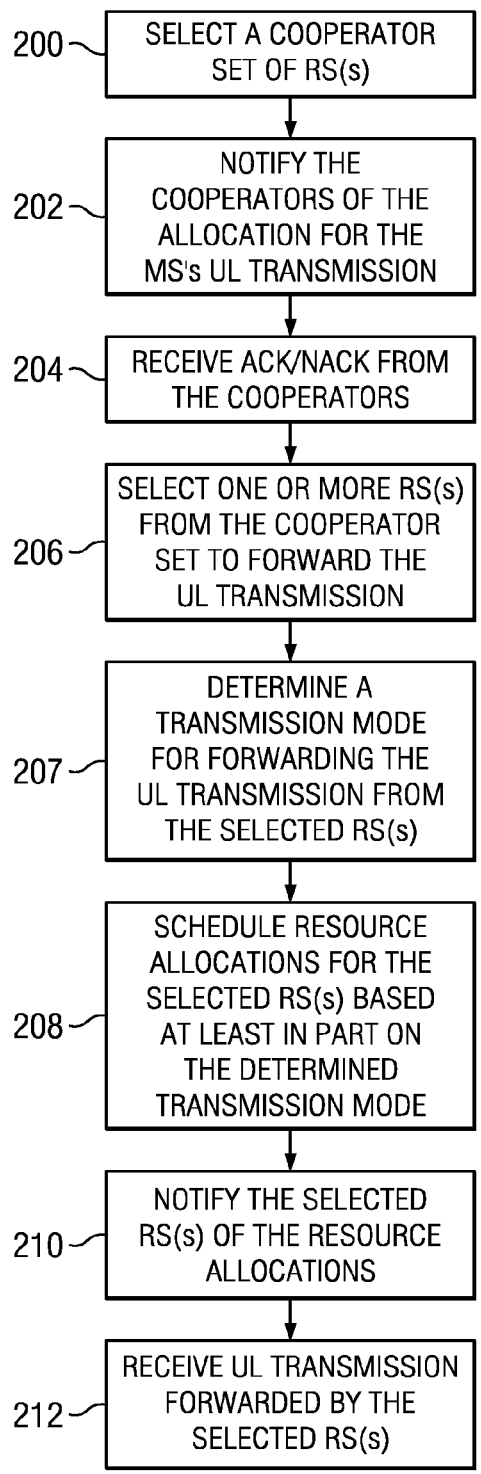
FIG. 2 is a flowchart showing a method for cooperative relay station forwarding according to an example embodiment of the invention.

FIG. 2 is a flowchart showing a method for cooperative relay station forwarding according to an example embodiment of the invention.

At block 200, the BS selects one or more RS(s) which listens to the UL transmission from the MS. In an example embodiment, the selection is made at least in part based on the link quality between a RS and the MS. For simplicity, the selected RS(s) are called a cooperator set. The RS(s) within the cooperator set are called cooperators. The selection of the cooperator set may be made and signaled for each UL transmission or on a slower timescale, for example every multiple of radio frames.

At block 202, the BS notifies each of the cooperators of allocation for the MS's UL transmission. In an example embodiment, the BS informs each cooperator of the UL transmission allocation by a cooperator dedicated channel. In another example embodiment, the BS informs each cooperator of the UL transmission allocation by a common channel shared by multiple cooperators. The UL allocation may comprise UL scheduling grant such as resource allocation, transmission format and so on.

The cooperator receives the UL transmission from the MS according to the UL transmission allocation, and then attempts to decode the UL transmission from the MS. The cooperator determines an acknowledgement (ACK) status if it successfully decodes the UL transmission or a non-acknowledgement (NACK) status if it fails to decode the UL transmission. The BS allocates physical resources for the cooperator to transmit a message for indicating whether it successfully received the UL transmission from the MS. In an example embodiment, the physical resources may comprise time resource, frequency resource and/or code resource. The cooperator transmits the ACK or NACK status to the BS through the message using the allocated physical resources. At block 204, the BS receives an ACK or a NACK from the RS(s) in the cooperator set.

At block 206, the BS selects one or more RS(s) from the cooperator set to forward the UL transmission to the BS. In an example embodiment, the RS(s) may be selected based at least in part on the received ACK/NACK, the resource situation in the RS(s), the link quality, or the like. The BS may select more than one RS to forward the correctly decoded UL transmission in a cooperative manner. In an example embodiment, the RS(s) that are selected for performing cooperative forwarding are called selected RS(s).

At block 207, the BS determines a transmission mode for forwarding the UL transmission from the selected RS(s) to the BS. In an example embodiment, the transmission mode may be determined based at least in part on the number of the selected RS(s), the resource situation in the selected RS(s), the link quality and/or the like.

In an example embodiment, the link quality refers to the uplink link quality between RS and BS. It may be measured by the BS based on an uplink reference signal transmitted by the RS. The resource situation of the RS may indicate amount of resource available in the RS, such as frequency domain resource and/or the number of resource blocks (RBs). The transmission mode may be at least one of a spatial multiplexing (SM) mode, a partial SM mode and a space time block coding (STBC) mode. In the SM mode different RSs may transmit different parts of equal length of the MS' uplink transmission to the BS in order to increase the spectral efficiency. In the partial SM mode different RSs may transmit different parts of unequal length of the MS' uplink transmission to the BS. In the STBC mode different RSs may transmit different copies of the MS' uplink transmission to the BS to enable the BS to exploit the various versions of the received data packet for diversity gain. In an example embodiment, if the link quality is above a threshold, the SM mode may be suitable as MS may desire a higher signal to noise ratio (SNR) for a successful receiving.

At block 208, the BS schedules resource allocations for the selected one or more RS(s). In an example embodiment, the resource may be allocated based at least in part on the determined transmission mode, the available resources in the selected RS(s), the link quality between the RS and the BS, and/or the like.

At block 210, the BS notifies the selected RS(s) of the resource allocations. In an example embodiment, the resource allocation is signalled by a resource allocation notification message. In an example embodiment, the BS generates a transmission mode indication message and embeds it in the resource allocation notification message transmitted to the selected RS(s). In an example embodiment, the transmission mode indication message indicates the determined transmission mode for forwarding the UL transmission from the selected RS(s) to the BS.

The selected RS(s) forwards its decoded UL transmission on the resource allocations according to the notification it received at block 210. At block 212, the BS receives the UL transmission forwarded by the selected RS(s).

The determination of the selected RS(s), the transmission mode, and resource allocations for the selected RS(s) may be made per data packet. The BS may signal the determination to the selected RS(s) for a UL transmission. In the case where the determination for the current UL transmission is same as that for the previous UL transmission, the BS may not signal the same information to the RS(s) to avoid additional signaling. In this case, the BS may generate a reuse message to be transmitted to the selected RS(s). The reuse message instructs the selected RS(s) to utilize a previously received determination. Based on a series of UL transmission, a flexible cooperative forwarding may be achieved.

Figure 3:
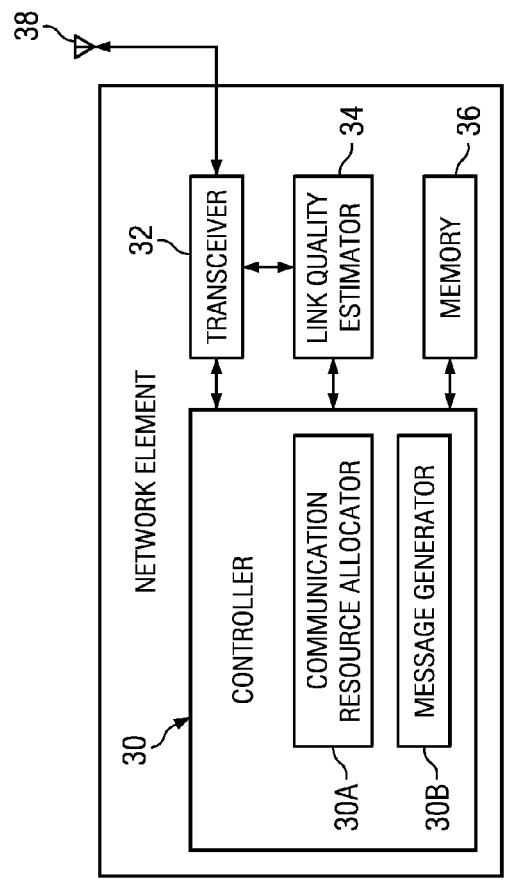
FIG. 3 shows a simplified block diagram of an embodiment of a network element that provides an environment for application of the example embodiments of the invention.

FIG. 3 shows a simplified block diagram of an embodiment of a network element that provides an environment for application of the example embodiments of the invention. The network element may represent, without limitation, a base station, a Node B, or the like. For example, the network element could be BS 14 of FIG. 1. The block diagram may be embedded in the network element as a component of the network element.

The network element comprises a controller or processor 30, memory 36, an antenna 38, a radio frequency transceiver 32, and a link quality estimator 34. The memory 36 is coupled to the controller 30 for storing programs and data of a temporary or more permanent nature. The radio frequency transceiver 32 is coupled to the antenna 38 and to the controller 30 for bidirectional wireless communications. The link quality estimator 34 is coupled to the transceiver 32 and to the controller 30 for evaluating quality of radio links. For example, the link quality estimator 34 measures the SNR of a pilot signal received by the transceiver 32, and reports the measured SNR to the controller 30.

The controller 30, which may be implemented with one or more processing devices, performs one or more functions associated with its operation comprising, without limitation, encoding and decoding of individual bits forming a communication message, formatting of information, operating processes related to management of communication resources. Example functions related to the management of communication resources may include, without limitation, traffic management, performance data analysis, tracking of end users, configuration management, management of mobile stations, and/or the like.

The controller 30 includes a communication resource allocator 30A configured to allocate time and frequency communication resources for transmission of data to/from a communication device, for example MS 10 or RS 12 of FIG. 1. A message generator 30B of the controller 30 is configured to format a message to notify the communication resources allocation to the communication device.

The transceiver 32 modulates information onto a carrier waveform for transmission of the information or data via the antenna 38 to the communication device. The transceiver 32 demodulates information or data received via the antenna 38 for further processing by the controller 30.

Usually, a resource block is used as a minimum resource allocation unit in Orthogonal Frequency Division Multiplexing (OFDM) based systems, for example LTE or WiMAX. One resource block may comprise one or more subcarriers in frequency domain, and one or more symbols in time domain. For illustration purpose, in below example embodiments a total of 10 resource blocks (RBs) are needed to transmit a UL transmission, for example a data packet, from the selected RS(s) to the BS and one resource block (RB) comprises 1 subcarrier in frequency domain and 4 symbols in time domain. The below example does not exclude other possibilities in frequency domain and/or time domain for one RB.

Figure 4:
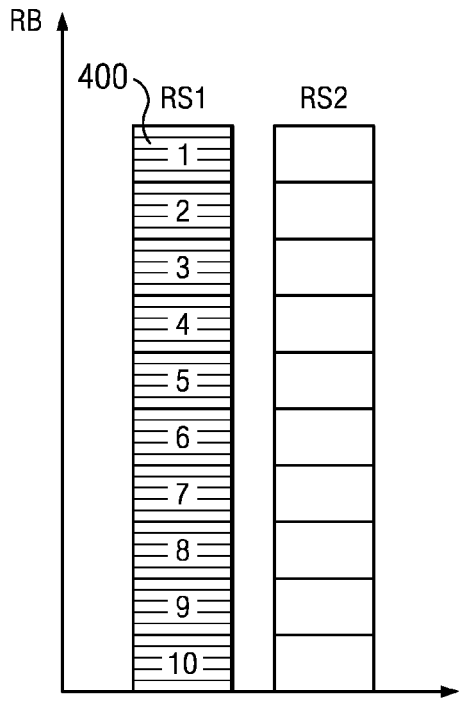
FIG. 4 shows a diagram of an example case where one relay station correctly decodes a data packet from a mobile station according to an embodiment of the invention.

FIG. 4 shows a diagram of an example case where one relay station correctly decodes a data packet from a mobile station according to an embodiment of the invention. In the example embodiment, the RS1 correctly decodes the data packet from the MS. The BS determines RS1 as the selected RS. It schedules a resource allocation for the RS 1. The RS1 forwards the data packet to the BS according to the received resource allocation. In FIG. 4, a block, 400, represents one RB resource. The resources that are allocated for forwarding the MS's transmission are shown as blocks filled with horizontal lines (applies to other embodiments hereafter). In FIG. 4, 10 RBs are allocated to the selected RS, RS1, to forward the MS's data packet.

In an example embodiment, if the link quality of both RSs is above the threshold for SM, the RS2 may be scheduled to transmit another MS's data packet in the same frequency resource though it is not qualified to forward the MS's data packet. If the link quality is below the threshold for SM, the RS2 may be scheduled to utilize the same frequency resource in a low priority.

The cooperative forwarding of decoded data packet to the BS using different transmission modes will be described in more detail hereafter. In the examples, two RSs act as the selected RS(s) for simplicity of explanation. However, embodiments of the invention are not limited to two selected RSs; it may be extended to more than two selected RSs, for example three selected RSs or more in practice.

Figure 5:
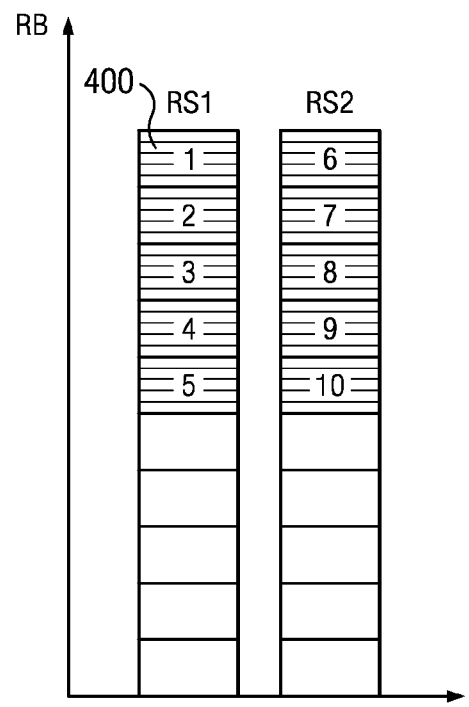
FIG. 5 shows a diagram of an example case where two relay stations correctly decode a data packet from the mobile station according to an embodiment of the invention.

FIG. 5 shows a diagram of an example case where two relay stations correctly decode a data packet from the mobile station according to an embodiment of the invention. In the example embodiment, because both RS1 and RS2 decode the MS transmission successfully and both RS1 and RS2 have sufficient resources available and the uplink relay link quality of both RS1 and RS2 is qualified for SM, the BS determines to use the SM mode. The BS determines both RS1 and RS2 as the selected RSs. It schedules resource allocations for the selected RSs and equal amount of RBs are allocated to the selected RSs. In an example embodiment, 5 RBs are allocated to RS1 and 5 RBs are allocated to RS2 as shown in FIG. 5. The selected RSs, RS1 and RS2, transmit the data packet to the BS according to the received resource allocation in a SM co-operative manner.

Figure 6:
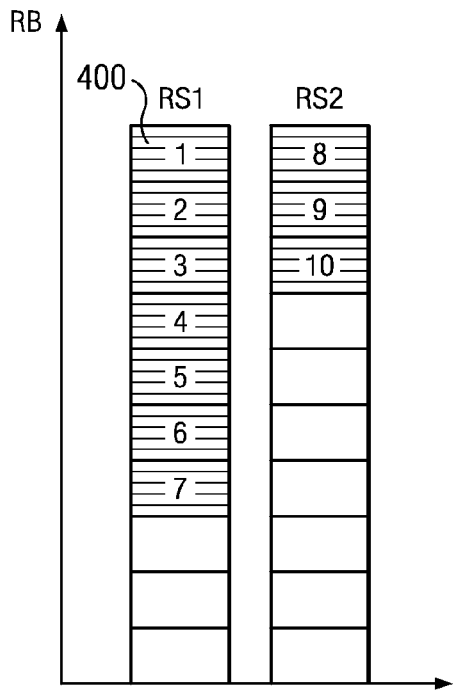
FIG. 6 shows a diagram of another example case where two relay stations correctly decode the data packet from the mobile station according to an embodiment of the invention.

FIG. 6 shows a diagram of another example case where two relay stations correctly decode the data packet from the mobile station according to an embodiment of the invention. In the example embodiment, both RS1 and RS2 decode the MS transmission successfully. The uplink relay link quality of both RS1 and RS2 is qualified for SM but not all RSs have sufficient resource available for SM transmission. For example, RS2 may not have sufficient resource available. In addition, the aggregated available resource on both RSs is sufficient for transmitting the data packet. The BS determines to use the partial SM mode. The BS determines both RS1 and RS2 as the selected RSs. It schedules resources allocations for the selected RSs. Considering the available resources in the selected RSs, unequal amount of RBs are allocated to the selected RSs. In an example embodiment, RS1 has 7 RBs available and RS2 has 3 RBs available. The BS allocates 7 RBs to RS1 and 3 RBs to RS2 as shown in FIG. 6 to forward the data packet in a partial SM cooperative manner.

In the partial SM mode, two or more selected RSs forward unequal part of the data packet using unequal number of RBs. The selected RS may need to know which part of the data packet to transmit to the BS. Additional signaling may be needed from the BS to inform the RS on the part of the data packet that is allocated to it for transmission. For example the BS may inform the selected RS at least one of the starting position or the ending position of the part of data packet that is allocated for transmission by the selected RS. The signaling of the information on the allocated part may not be performed in some embodiments if the BS and the selected RSs comply with some predetermined rules.

In an example embodiment, when there are two selected RSs, one selected RS may transmit a part of the data packet in ascending order starting from the beginning of the sequence for the data packet and another selected RS may transmit the remaining part of the data packet in descending order starting from the end of the sequence for the data packet. In this case, no signaling is used to inform the selected RSs on which part is allocated to them, but a forwarding order message may be used to instruct the selected RS to use ascending order or descending order. In an example embodiment, the forwarding order message may be generated and embedded in the resource allocation notification message transmitted to the selected RSs.

Figure 7:
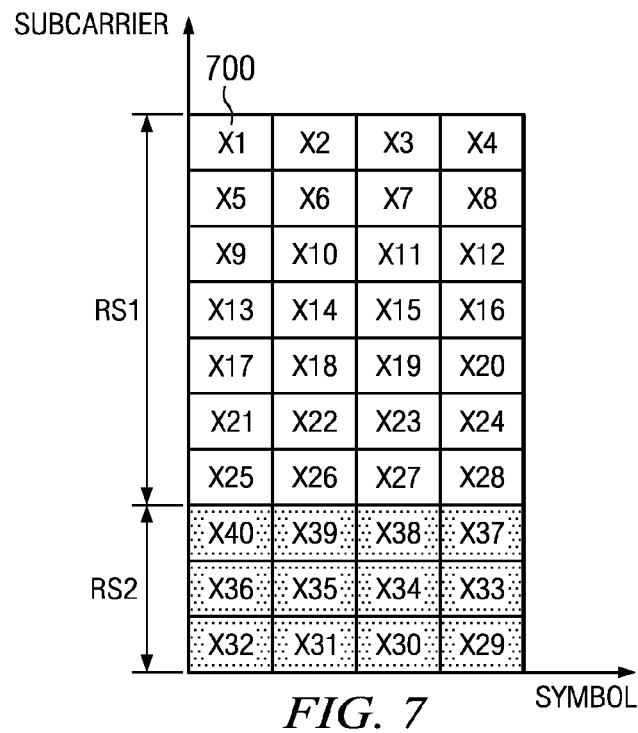
FIG. 7 shows an example of resource block allocation and mapping for the example of FIG. 6 according to an embodiment of the invention.
Figure 8:
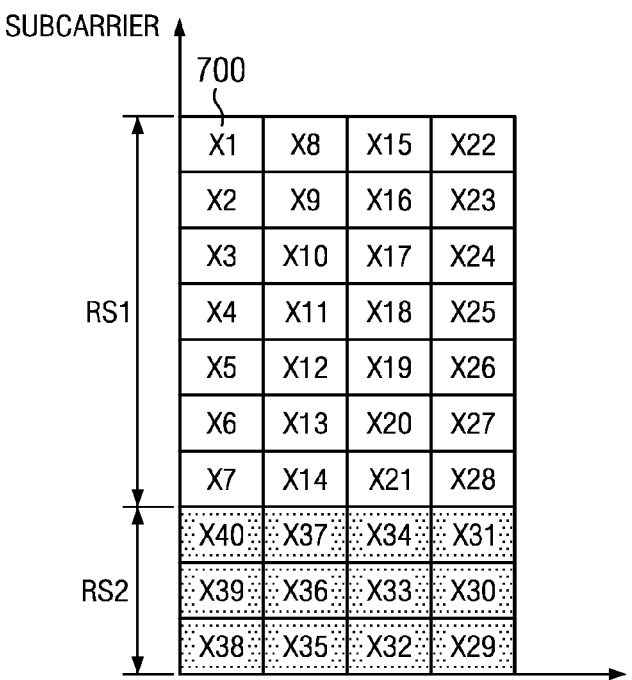
FIG. 8 shows another example of resource block allocation and mapping for the example of FIG. 6 according to an embodiment of the invention.

FIG. 7 and FIG. 8 show two examples of resource block allocation and mapping for the example of FIG. 6 according to an embodiment of the invention. A block, 700, represents one frequency-time block. As illustrated in the above examples, a total of 40 frequency-time blocks are needed in frequency and time for one data packet. In FIG. 7 and FIG. 8, X1 represents the first part of the sequence for the data packet, X2 represents the second part of the sequence for the data packet, X3 represents the third part of the sequence for the data packet, . . . , and X40 represents the last part of the sequence for the data packet. In the example of FIG. 6, 7 RBs are allocated to RS1 and 3 RBs are allocated to RS2. One RB comprises 1 subcarrier in frequency domain and 4 symbols in time domain, thus one RB comprises a total of 4 frequency-time blocks. Consequently, 28 frequency-time blocks are allocated to RS1 and 12 frequency-time blocks are allocated to RS2. In an example embodiment, RS1 fills the 28 frequency-time blocks in ascending order starting from the beginning of the sequence for the data packet, and RS2 fills the 12 frequency-time blocks in descending order starting from the end of the sequence for the data packet. In this way, no additional signaling is needed to inform RS1 or RS2 regarding the part of the data packet that is allocated to it for transmission.

In an example embodiment, the selected RS may be scheduled to adopt a time domain first way to fill its frequency-time blocks. In the time domain first way, the selected RS fills one subcarrier in time domain first, and then moves to the next subcarrier in frequency domain. As shown in FIG. 7, both RS1 and RS2 are scheduled to adopt the time domain first way. RS1 fills the upmost subcarrier using X1, X2, X3 and X4 in time domain, then fills the next subcarrier using X5, X6, X7 and X8, and so on. RS2 fills its upmost subcarrier using X40, X39, X38, and X37 in time domain, then fills the next subcarrier using X36, X35, X34 and X33, and so on.

In another example embodiment, the selected RS may be scheduled to adopt a frequency domain first way to fill its frequency-time blocks. In the frequency domain first way, the selected RS fills one symbol in frequency domain first, and then moves to the next symbol in time domain. As shown in FIG. 8, both RS1 and RS2 are scheduled to adopt the frequency domain first way. RS1 fills the first symbol using X1, X2, . . . , X7 in frequency domain, then fills the next symbol using X8, X9, . . . , X14, and so on. RS2 fills the first symbol using X40, X39 and X38 in frequency domain, then fills the next symbol using X37, X36, and X35, and so on.

In an example embodiment, a domain order message may be used to instruct the selected RS(s) to use the frequency domain first way or the time domain first way. In an example embodiment, the domain order message may be generated and embedded in the resource allocation notification message transmitted to the selected RS(s).

Figure 9:
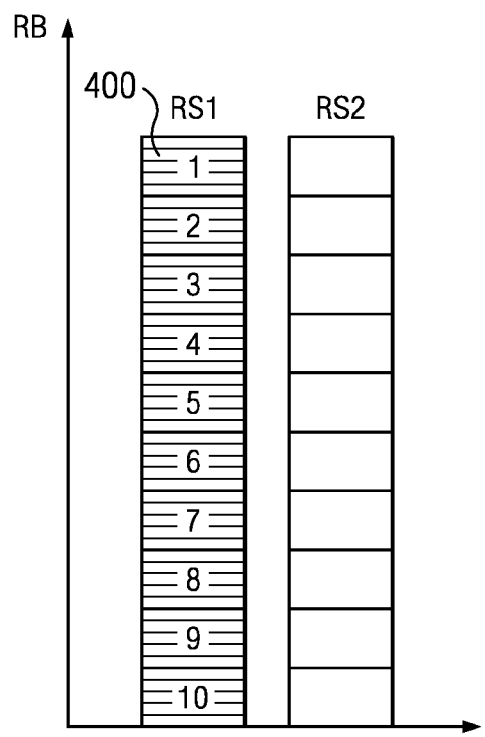
FIG. 9 shows a diagram of yet another example case where two relay stations correctly decode the data packet from the mobile station according to an embodiment of the invention.

FIG. 9 shows a diagram of yet another example case where two relay stations correctly decode the data packet from the mobile station according to an embodiment of the invention. In an example embodiment, both RS1 and RS2 decode the MS' transmission successfully, the uplink relay link quality of both RS1 and RS2 is qualified for SM but only one RS has available resource and the available resource is sufficient for forwarding the data packet to the BS. For example RS1 has sufficient resource available, RS2 has no resource available. The BS determines RS1 as the selected RS. It schedules a resource allocation for RS1. RS1 forwards the data packet to the BS according to the received resource allocation. In FIG. 9, 10 RBs are allocated to the selected RS, RS1, to forward the MS's data packet.

Figure 10:
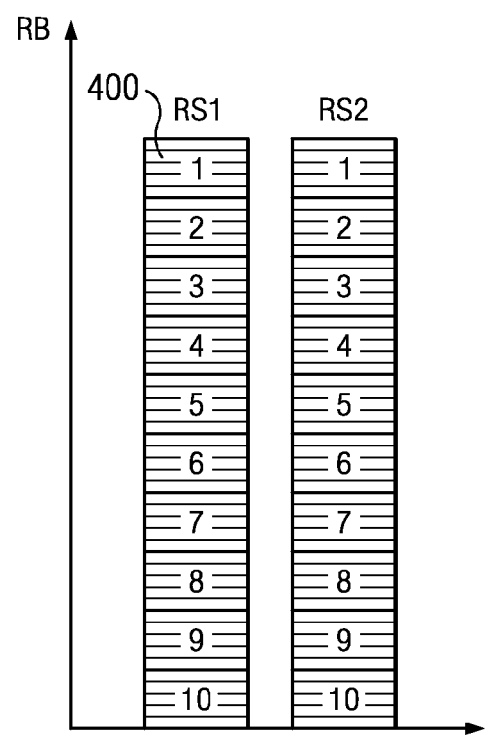
FIG. 10 shows a diagram of yet another example case where two relay stations correctly decode the data packet from the mobile station according to an embodiment of the invention.

FIG. 10 shows a diagram of yet another example case where two relay stations correctly decode the data packet from the mobile station according to an embodiment of the invention. In an example embodiment, both RS1 and RS2 decode the MS' transmission successfully and both RS1 and RS2 have sufficient resource available, but at least one of the uplink relay link quality of the RSs is not qualified for SM. The BS determines to use the STBC mode. The BS determines both RS1 and RS2 as the selected RSs. It schedules resource allocation for the selected RSs. In an example embodiment, 10 RBs are allocated to RS1 and 10 RBs are allocated to RS2 as shown in FIG. 10. The selected RSs, RS1 and RS2, will transmit the data packet to the BS according to the received resource allocation in a STBC co-operative manner.

In yet another example embodiment, both RS1 and RS2 decode the MS' transmission successfully, but neither RS1 nor RS2 has sufficient resources available and at least one of the uplink relay link quality of the RSs is not above the threshold for SM, the BS determines to schedule the data packet in next available time.

Without in any way limiting the scope, interpretation, or application of the claims appearing below, a technical effect of one or more of the example embodiments disclosed herein is the flexibility in selecting the transmission mode and the flexibility in selecting the selected RS(s). Another technical effect of one or more of the example embodiments disclosed herein is the lower average latency compared with a fixed transmission mode due to the different options. Another technical effect of one or more of the example embodiments disclosed herein is the acceptable signaling overhead to utilize the flexible cooperative forwarding.

Embodiments of the present invention may be implemented in software, hardware, application logic or a combination of software, hardware and application logic. The software, application logic and/or hardware may reside on BS or RS. If desired, part of the software, application logic and/or hardware may reside on BS, part of the software, application logic and/or hardware may reside on RS. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor; and
   at least one memory including computer program code,
   the at least one memory and the computer program code configured to, with the at least one processor, cause the apparatus to perform at least the following:
   receive acknowledgement or non-acknowledgement messages from a plurality of relay stations, wherein the acknowledgement or non-acknowledgement messages are indicative of whether or not a relay station successfully decodes a data packet transmission from a mobile station;
   select at least two relay stations from the plurality of relay stations;
   determine a transmission mode for cooperatively forwarding the data packet by the selected relay stations to a base station;
   schedule a resource allocation for a selected relay station based at least in part on the transmission mode; and
   notify the selected relay stations of the resource allocation by using a domain order message to instruct the selected relay stations to use a frequency-domain-first approach or a time-domain-first approach;
   wherein according to the frequency-domain-first approach the selected relay stations fill a first symbol in a frequency domain first, and then move to a second symbol in a time domain;
   wherein according to the time-domain-first approach the selected relay stations fill a first subcarrier in the time domain first, and then move to a second subcarrier in the frequency domain; and
   wherein the determine or the select is based on (a) a link quality of the selected relay stations and a mobile station, (b) a resource situation of the selected relay stations, and (c) a received acknowledgement or non-acknowledgement message.

2. The apparatus according to claim 1, wherein the transmission mode comprises at least one of a spatial multiplexing mode, a partly spatial multiplexing mode, and a space time block coding mode.

3. The apparatus according to claim 1, wherein the apparatus is caused to perform the selection, determination and scheduling per data packet.

4. The apparatus according to claim 1, wherein the resource allocation for the selected relay stations comprises an equal or an unequal amount of resource blocks.

5. The apparatus according to claim 1, wherein the determination is further based at least in part on the received acknowledgement or non-acknowledgement messages.

6. The apparatus according to claim 1, wherein the apparatus is further caused to generate a transmission mode indication message to be transmitted to the selected relay stations.

7. The apparatus according to claim 1, wherein the apparatus is further caused to generate a reuse message to be transmitted to the selected relay stations to instruct the selected relay stations to utilize a previously received determination of at least one of the selected relay stations, the transmission mode, and the resource allocation for the selected relay stations.

8. A method, comprising:
   receiving acknowledgement or non-acknowledgement messages from a plurality of relay stations, wherein the acknowledgement or non-acknowledgement messages are indicative of whether or not a relay station successfully decodes a data packet transmission from a mobile station;
   selecting at least two relay stations from a plurality of relay stations;

determining a transmission mode for cooperatively forwarding the data packet by the selected relay stations to a base station;

scheduling a resource allocation for a selected relay station based at least in part on the transmission mode; and notifying the selected relay stations of the resource allocation by using a domain order message to instruct the selected relay stations to use a frequency-domain-first approach or a time-domain-first approach;

wherein according to the frequency-domain-first approach the selected relay stations fill a first symbol in a frequency domain first, and then move to a second symbol in a time domain;

wherein according to the time-domain-first approach the selected relay stations fill a first subcarrier in the time domain first, and then move to a second subcarrier in the frequency domain; and wherein the determining or the selecting is based on (a) a link quality of the selected relay stations and a mobile station, (b) a resource situation of the selected relay stations, and (c) a received acknowledgement or non-acknowledgement message.

9. The method according to claim 8, wherein the transmission mode comprises at least one of a spatial multiplexing mode, a partly spatial multiplexing mode, and a space time block coding mode.

10. The method according to claim 8, wherein the selecting, determining and scheduling are operated per data packet.

11. The method according to claim 8, wherein the resource allocation for the selected relay stations comprises an equal or an unequal amount of resource blocks.

12. The method according to claim 11, wherein scheduling the resource allocation comprises scheduling an unequal amount of resource blocks for two selected relay stations, wherein
one selected relay station is scheduled to transmit a part of the data packet in ascending order from the beginning of a sequence for the data packet; and another selected relay station is scheduled to transmit the remaining part of the data packet in descending order from the end of the sequence for the data packet.

13. The method according to claim 12, further comprising:
generating a forwarding order message to be transmitted to the selected relay stations to indicate to the selected relay stations to use one of the ascending order and the descending order.

14. The method according to claim 8, wherein scheduling the resource allocation comprises scheduling the selected relay stations to use the resource allocation in one of a time domain first way and a frequency domain first way.

15. The method according to claim 8, further comprising:
transmitting to the selected relay stations a reuse message to instruct the selected relay stations to utilize a previously received determination of at least one of the selected relay stations, the transmission mode, and the resource allocation for the selected relay stations.

16. A computer program product comprising a non-transitory computer-readable medium bearing computer program code embodied therein for use with a computer, the computer program code comprising:
code for receiving acknowledgement or non-acknowledgement messages from a plurality of relay stations, wherein the acknowledgement or non-acknowledgement messages are indicative of whether or not a relay station successfully decodes a data packet transmission from a mobile station;

code for selecting at least two relay stations from a plurality of relay stations;

code for determining a transmission mode for cooperatively forwarding the data packet by the selected relay stations to a base station;

code for scheduling a resource allocation for a selected relay station based at least in part on the transmission mode; and code for notifying the selected relay stations of the resource allocation by using a domain order message to instruct the selected relay stations to use a frequency-domain-first approach or a time-domain-first approach;

wherein according to the frequency-domain-first approach the selected relay stations fill a first symbol in a frequency domain first, and then move to a second symbol in a time domain;

wherein according to the time-domain-first approach the selected relay stations fill a first subcarrier in the time domain first, and then move to a second subcarrier in the frequency domain; and wherein the determining or the selecting is based on (a) a link quality of the selected relay stations and a mobile station, (b) a resource situation of the selected relay stations, and (c) a received acknowledgement or non-acknowledgement message.

17. The computer program product according to claim 16, wherein the transmission mode comprises at least one of a spatial multiplexing mode, a partly spatial multiplexing mode, and a space time block coding mode.

18. The computer program product according to claim 16, wherein the selecting, determining and scheduling are operated per data packet.

19. The apparatus according to claim1:
wherein notify the selected relay stations further comprises notify the selected relay stations of the resource allocations by using the domain order message to instruct the selected relay stations to use a frequency-domain-first approach or a time-domain-first approach in order to fill resources corresponding to their respective resource allocations with information from an uplink transmission from a user equipment; and wherein the at least one memory and the computer program code are further configured, with the at least one processor, to cause the apparatus to perform at least the following: receive, using the resources corresponding to the resource allocations, an uplink transmission from the user equipment forwarded by the selected relay stations.

* * * * *